Aug. 4, 1925.
G. CHRISTENSON
1,548,580
HEAVY DUTY PLUNGER AND PACKING THEREFOR
Filed June 17, 1924
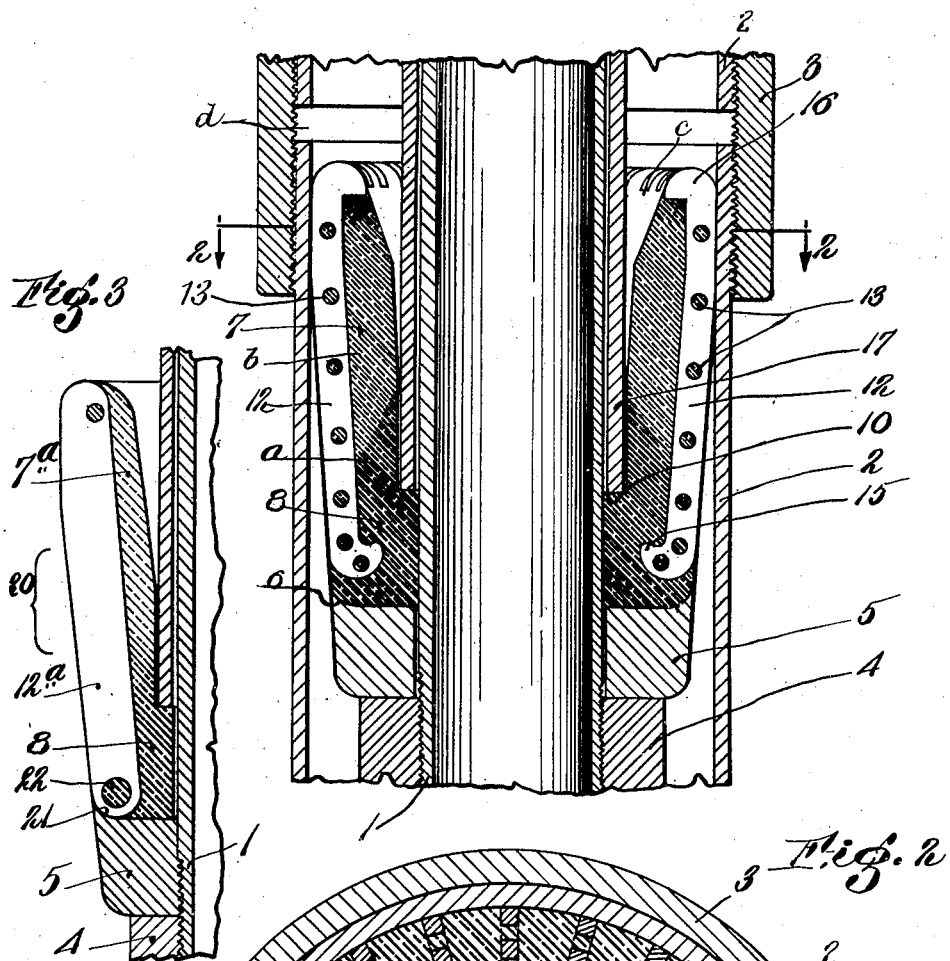
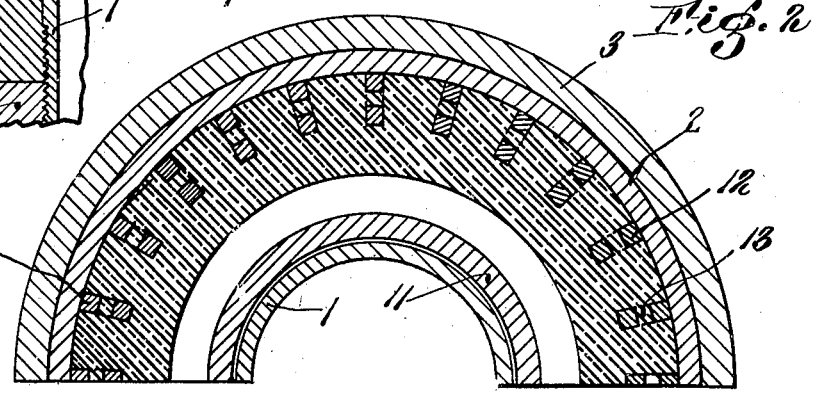
Inventor
George Christenson Patented Aug. 4, 1925.

1,548,580

UNITED STATES PATENT OFFICE.

GEORGE CHRISTENSON, OF NORTH PLAINFIELD, NEW JERSEY, ASSIGNOR TO JOHNS-MANVILLE, INCORPORATED, OF NEW YORK, N. Y., A CORPORATION OF NEW YORK.

HEAVY-DUTY PLUNGER AND PACKING THEREFOR.

Application filed June 17, 1924. Serial No. 720,669.

*To all whom it may concern:*

Be it known that I, GEORGE CHRISTENSON, a citizen of the United States of America, and resident of North Plainfield, in the county of Somerset and State of New Jersey, have invented new and useful Improvements in Heavy-Duty Plungers and Packings Therefor, of which the following is a specification.

This invention relates to heavy-duty plungers, lifting bailers or swabs, so-called, and is particularly concerned with devices adapted to create a fluid-tight connection under very great pressures between a stem or hoisting rod and an irregular and broken interior cylindrical surface, such as the ordinary tubular casing of a deep well.

It has been customary practice under some conditions to elevate liquid from oil wells and deep artesian wells where the flow is not spontaneous by the so-called swabbing or bailing method in which the well-casing is employed as the cylinder of a lift pump, the plunger usually comprising a weighted stem attached to a hoisting cable. This stem is ordinarily tubular, and is provided with a series of packings adapted to bridge the space between the stem and the interior surface of the casing. The tubular stem may be closed against flow in one direction by the usual check valve, to enable the liquids to pass the descending swab which is withdrawn by hoisting the cable, thus bringing with it the superimposed column of liquid. The pressure to which the packings are often subjected in swabbing practice are very great, and this, together with the mechanically-imperfect interior surface of the well-casing has resulted in rapid destruction of and unreliable and inefficient operation of packing devices heretofore relied upon.

Objects of this invention are to provide a lifting plunger for pumping or swabbing adapted efficiently to form a fluid-tight connection with the walls of a cylinder or well casing; to provide a packing capable of withstanding very great pressures and adapted to form a fluid-tight connection with a relatively imperfect cylindrical surface; to provide improved reinforcing means for protecting the packing against collapse by pressure and against broken or irregular surfaces in rough and uneven pipes, and thus to prevent mutilation and injury to the packing; and in general, to provide a plunger packing having features of construction permitting efficient performance in the indicated environment.

The invention is illustrated in preferred forms in the accompanying drawings in which—

Fig. 1 is a vertical sectional elevation of a swab in a well-casing,

Fig. 2 is an enlarged transverse section taken on the line 2—2 of Fig. 1; and

Fig. 3 is a similar section showing a modification.

Referring to the drawings, the swab may comprise a tubular stem 1 which is shown within a cylindrical well-casing 2 having abutting pipe sections held together by collars 3. A portion of the stem 1 may be exteriorly screw-threaded to receive a nut 4 on which rests a calyx 5 which is provided with a concave upper surface 6 to support the packing cup or sleeve 7, 8, of which only one of the series recommended to be used is shown in Fig. 1.

The packing cups may be flaring frusto-conical bodies having an annular section or heel 8 which rests in the concave upper surface of the calyx 5. Preferably the cups 7, 8, are made of a rubber compound of a type exhibiting when vulcanized great durability and resistance to fatigue from deformation of shape, and of a structure, hereinafter described, in aid of the natural qualities of the vulcanized rubber compound to enable the complete cup to resist the relatively great longitudinal and radial pressures and rough treatment to which it is subjected. One preferred form of packing comprises a solid of revolution integrally moulded, comprising portions of different grades or qualities of the moulded rubber compound (or rubber substitute) one of which kinds of compound when subjected to vulcanizing under the same temperature and pressure as the other, will become relatively stiff and rigid, whereas the other kind of compound under the same treatment will become a relatively flexible and relatively yielding resilient body. For example the cup 7, 8 may comprise a heel portion made as an annulus 8, as illustrated by the more heavily shaded section, the upper boundary of which extends inwardly and upwardly (in integral continuity with the remainder of the cup) to form substantially a cone. Annulus 8 may be made of a rubber compound heavily charged with sulphur, and if desired with other vulcanizing agents or facilitators, and so adapted when finished by subjecting it in a mould to a vulcanizing heat and pressure to present a very great elastic resistance to deformation of shape by crushing or shearing, but nevertheless to be reasonably extensible under great pressures. Rubber compounds capable of producing the results indicated are well known in the art.

The intermediate or central regions $b$ of the cup 7, 8 is preferably made of a softer, less heavily sulphuretted, material and therefore, when vulcanized, provides a more easily extensible and more flexible compound than the annulus 8. Preferably the integral cup 7, 8 is a solid of revolution approximately of the form shown in the drawings. The portion above the calyx 5 comprises in general a flaring or conical annular solid tapered away to an edge $c$, preferably substantially larger at the lip $c$ than at the heel part 8. As indicated by heavily shaded lines the region of the cup near the lip $c$ may be of the more heavily sulphuretted rubber compound, of a rigidity and stiffness comparable with the heel portion 8. It may be desirable under some conditions to vary the proportions of the packing cup, especially the relative dimensions of the relatively flexible intermediate portion $b$.

A preferred construction comprises a reinforcement serving as a guide and protector for the exterior surface of the cup 7, 8 and adapted to prevent the lip $c$ or other portions of the packing from catching in projections and from entering deeply any hollow spaces such as the space $d$ at the abutting ends of the well-casing pipe sections, as shown at Fig. 1. The reinforcement may of course vary; as shown, this comprises a spaced series of laterally resilient radially placed flat metallic plates 12 having rounded ends 16 and anchored end portions (for example, providing the hooks 15) and firmly embedded in the substance of the cup 7. Preferably the reinforced cups 7, 8 are moulded at one operation in a mould already containing in proper spaced relation a sufficient number of plates 12 of suitable material, such as spring-tempered tool steel. In order to secure the plates in efficient attachment to the material of the cup, apertures 13 for flow of the rubber compound may be formed in the plates; preferably the apertures are spaced nearer to each other at and near the lower ends of the plates 12 in order firmly to secure the lower ends in the relatively rigid material of the heel portion 8. As shown the plates 12 are so embedded within the substance of the cup as to cause the exterior surface of the plates to coincide with the exterior surface of the body portion of the cup. Under the pressures of use, there is no leakage of liquid between the material of the cup 7, 8 and the plates 12.

Preferably the anchorage of the plates 12 at the bottom is in the substance of the portion 8 and spaced from the calyx 5, to permit motion by flexure of the substance of portion 8.

As shown in Fig. 1 the ring 4 and cup 5 are screwed up to the desired position on the stem 1 in order to force packing cup 7 against the spacing sleeve 11, an annular shoulder 10 being provided in the heel 8 against which the sleeve 11 is adapted to bear. As so mounted, the plates 12 severally can yield outwardly with portions of the cup 7, 8 under very great pressure developed within the cup and so permit a satisfactory fluid-tight contact between the upper portion of the cup and the wall of the well-casing 2. Any obstruction encountering the exterior surface of the packing when under pressure will, however, displace the cup and one or more of the plates 12, and thus result in the local depression only of the margin of the cup, which is the desired effect. The plates 12 not only serve as skids, runners or guides for the cup 7 but also to guard the cup from intermediate expansion into the grosser irregularities in the interior cylindrical surface of the well-casing, without preventing liquid-tight contact with normal surfaces.

When a relatively greater resilient expansive freedom of the packing is desired, the cup 20 and reinforcing plates 12$^a$ may have the form shown in Fig. 3, presenting a greater longitudinal elongation of the cup wall 7$^a$, and a greater outward freedom of motion of the plates 12$^a$, which may rock at their rounded bottom extremities 21 on the calyx 5 and about the inclusions 22 moulded of the harder portion 8 of the cup in the concentric holes 23 at their lower ends. Any desired number of interlocking apertures may be resorted to elsewhere in the plates 12$^a$; for example, one only at 25, at the lip end. The harder lip section of Fig. 1 may be omitted, if this is desirable.

It will be observed that expansion of the packing described involves a stretching increase of the perimeter of the moulded cup or sleeve, which has been contrived to be permitted without restriction by the metallic reinforcement. Such stretching, on the contrary, is facilitated by the comparatively small proportion of the circumferential dimension of the packing occupied by the lesser cross-sectional dimension of the metal reinforcements, which nevertheless are highly rigid in a direction radial to the stem and cup, and therefore highly effective as skids to bridge depressions or guides to avoid locking collisions with projections from the casing wall, and as stiffening resistances against longitudinal or radial pressures.

I claim:

1. Packing comprising an expansible solid of revolution having therein radially placed and longitudinally extending flat metallic reinforcements.

2. Packing comprising an expansible solid of revolution having therein radially placed and longitudinally extending flat metallic reinforcements having an edge coincident with a corresponding surface of said solid.

3. Packing comprising a vulcanized rubber compound solid of revolution having regions of relatively different flexibility, and reinforcements of greater radial than circumferential dimensions moulded into said packing and at one edge coincident with the peripheral surface of said annulus.

4. A cup for fluid-tight packing between a stem and a cylindrical tube of imperfect form comprising an annular yielding solid of revolution having a heel portion of relatively lesser flexibility, and having flat metallic reinforcements extending through both said portions.

5. In a swabbing device for use in deep wells, the combination of a stem and a packing comprising an expansible solid of revolution having therein radially placed and longitudinally extending flat metallic reinforcements, and means for supporting one end of said packing on said stem.

6. In a swabbing device for use in deep wells, the combination of a stem and an expansible flaring cup packing having regions differing in relative rigidity, in combination with reinforcements lying in radial planes of said cup and on the exterior surface of the cup, and means for supporting one end of said packing on said stem.

7. An integral moulded rubber-compound swab packing comprising a frusto-conical cup having an intermediate portion of relatively greater flexibility than the opposed end portions, and flat reinforcement plates moulded into said cup in radial planes and in spaced relationship and having a longitudinal edge coincident with an exterior surface of said cup.

8. A liquid driving plunger comprising a stem, a calyx surrounding said stem, means for supporting the calyx, an expansible rubber-compound cup having a heel in said calyx, said heel being of relatively greater rigidity than the intermediate portion of the cup, means for holding the cup against said calyx, and a series of reinforcement plates moulded into said cup their greater dimensions lying substantially longitudinally and radially of the said heel and intermediate portions of the cup.

9. A reinforcement plate of resilient metal for packing sleeves or cups comprising an elongate flat body having apertures therein and an edge terminating in a rounded portion.

Signed by me at North Plainfield, New Jersey this 3rd day of June, 1924.

GEORGE CHRISTENSON.